2 Sheets—Sheet 1.

J. PINE.

Harvester.

No. 7,914. Reissued Oct. 16, 1877.

Witnesses
W. B. Masson
W. R. Edelen

Inventor:
James Pine
by E. E. Masson
atty

N. PETERS, PHOTO-LITHOGRAPHER, WASHINGTON, D. C.

J. PINE.
Harvester.

No. 7,914. Reissued Oct. 16, 1877.

*Witnesses*
W. B. Masson
W. R. Edelen.

*Inventor*
James Pine
by E. E. Masson,
atty.

N. PETERS, PHOTO-LITHOGRAPHER, WASHINGTON, D. C.

UNITED STATES PATENT OFFICE.

JAMES PINE, OF TROY, NEW YORK.

IMPROVEMENT IN HARVESTERS.

Specification forming part of Letters Patent No. 32,266, dated May 7, 1861; Reissue No. 7,914, dated October 16, 1877; application filed August 23, 1876.

*To all whom it may concern:*

Be it known that I, JAMES PINE, of Troy, in the county of Rensselaer and State of New York, have invented a new and Improved Raking Device for Harvesters; and I do declare that the following is a full, clear, and exact description of the same, reference being had to the annexed drawings, making a part of this specification, in which—

Figure 1:
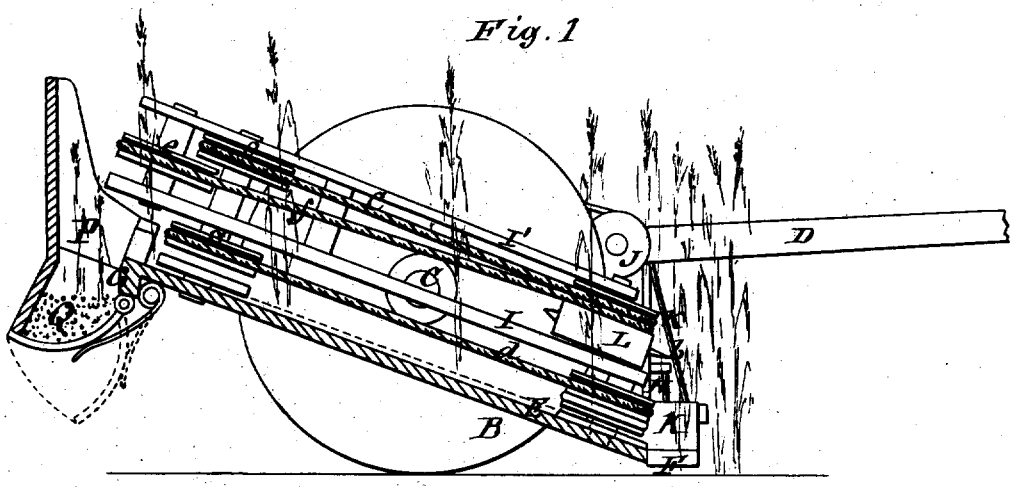
Figure 3:
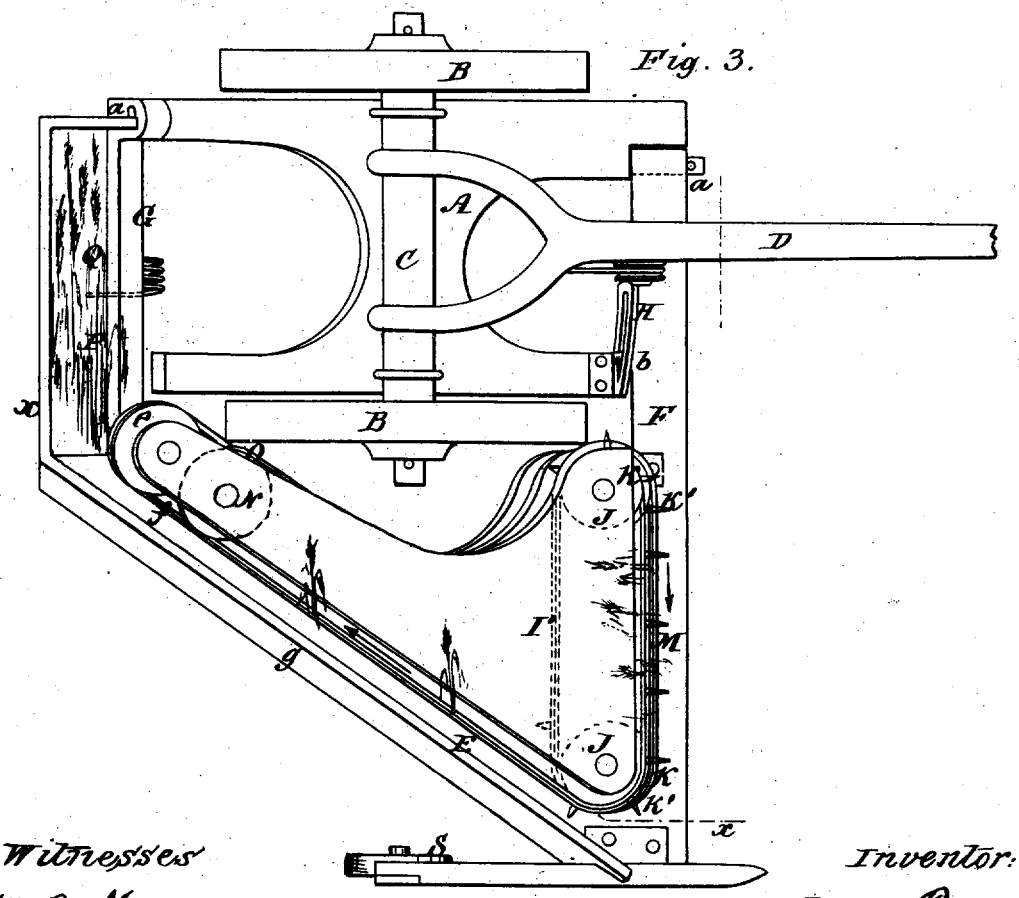
Figure 2:
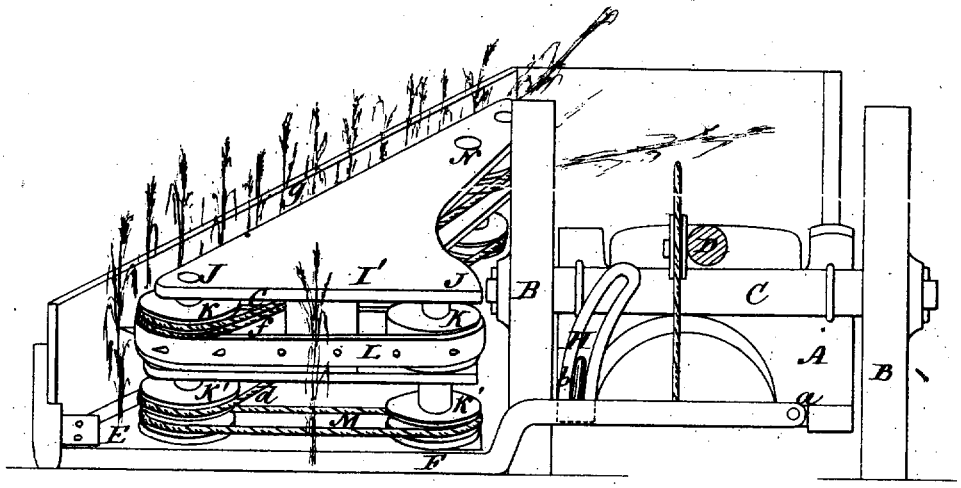

Figure 1 is a side sectional view of my invention, taken in the line *x x*, Fig. 3; Fig. 2, a front view of my invention; Fig. 3, a plan or top view of the same.

Similar letters of reference indicate corresponding parts in the several figures.

In the drawings, the finger-bar and cutting apparatus are represented on the right-hand side of the driving-wheels, looking in the direction of the forward movement of the machine. This side of the machine I designate hereinafter as the "grain side" of the machine, and the left or opposite as the "stubble side" of the machine.

This invention consists, first, in a novel and improved arrangement of a raking apparatus which carries the cut grain across the platform from the stubble side to the grain side of the machine in a line parallel, or nearly so, to the finger-bar and cutting apparatus, then compresses it against a guard-board, and conveys the cut grain diagonally across the platform, and deposits the same on the stubble side of the machine; second, a gear-frame and driving apparatus supported by two driving-wheels, and a self-raking device connected therewith in such a manner that the automatic raking device can follow the undulation of the ground independent of the up-and-down movement of the driving-wheels and driver's seat; third, in combining, with an automatic raking device, two driving or supporting wheels, so that the driver can be supported upon a cart-machine—that is, upon a machine having two driving or supporting wheels; fourth, the use of a dumping-box at the end of the raking device, to enable the operator to deposit the gavel in a compact form for binding; fifth, a reaping-machine, so constructed that the fingers of the rake shall pass parallel, or nearly so, to the line of the cutters, in order to gather the grain as it is cut along the line of the cutters, to be deposited for a gavel.

To enable those skilled in the art to fully understand and construct my invention, I will proceed to describe it.

A represents the main frame of the machine, supported by two wheels, B B, to the axle C, to which the draft-pole D is connected. E is the platform, which is attached to the main frame A by the finger-bar F and a bar, G, at the back end of the platform. These bars F G are connected, respectively, to the front and back ends of the main frame A by joints *a a*, which admit of the platform rising and falling to conform to the inequalities of the surface of the ground. This yielding movement of the platform E is controlled or guided by a slotted segment, H, attached to the front end of the platform on arm *b*, which is attached to the finger-bar, being fitted in segment H. I I′ represent two parallel horizontal plates, which are placed on the platform E, the lower plate I projecting rather farther forward than the upper plate I′. At the front parts of the plates I I there are placed vertical shafts J J J′ J′, and on these shafts pulleys K K K′ K′ are placed. The pulleys K K are between the plates I I′, and the pulleys K′ K′ are between the lower plate I and the platform E, the lower pulleys K′ K′ projecting rather farther forward than the upper pulleys K K.

Around each pair of pulleys K K K′ K′ endless straps L M pass. These straps are provided with teeth, and are parallel with the finger-bar; but the lower strap M is nearer the finger-bar than the upper one L, on account of the position of the pulleys K K′, as previously described.

At the back part of the plates I I′ there is a vertical shaft, N, on which two pulleys, O O′, are placed, the upper pulley O being between the two plates I I′, and the pulley O′ between the lower plate I and the platform.

Around the upper pulley O and the outermost pulley K of the upper pair K K, an endless toothed apron, C, passes, and a similar apron, *d*, passes around the lower pulley O of the shaft N, and the outermost pulley K′ of the lower pair at the front end of the platform. At the back parts of the plates I and I′ there is placed a pulley, *e*, around which and the outermost pulley K of the upper pair of rollers an endless toothed strap, *f*, passes.

At the back part of the platform E there is a box or receptacle, P. This box or receptacle is attached to the back bar G of the platform, and it has a hinged bottom, Q, which may be opened at the will of the operator, through the medium of a suitable lever or other proper device. At the outer side of the platform E there is attached a vertical board or guard, *g*.

The operation of the machine is as follows: As the machine is drawn along the endless toothed straps L M *c d f* are rotated in the direction indicated by the arrows, power being communicated to shaft N in any proper way, and the cut grain is forced back by the usual reel (not represented) against the toothed straps L M, the grain as it rests against said straps being slightly inclined from a vertical position, owing to the lower strap M being rather farther forward.

The straps L M conduct the cut grain to the straps *c d f*, which conduct it along by the side of the guard *g* to the back end of the platform, where it is discharged into the receptacle P, the bottom Q of which is opened from time to time by the driver, so that the grain may be discharged on the ground in proper-sized gavels.

By this arrangement the cut grain is conveyed back to the box or receptacle P in a uniform manner, and is discharged in proper gavels with the straw evenly disposed, so as to facilitate the binding operation.

In consequence of having the platform E connected to the main frame A by joints or hinges, the platform is allowed to rise and fall freely, and conform to the inequalities of the surface of the ground.

The outer or grain end of the platform E is supported by a grain-wheel, S.

One or more of the endless bands may, if preferred, be replaced by chains or cords, which will serve to hold the grain in proper position, and forward it to the desired point, and the bands or cords may, if preferred, pass continuously around the pulleys K K′ and O O′ *e*.

What I claim as new, and desire to secure by Letters Patent, is—

1. The combination, in a harvesting-machine, of two driving or supporting wheels, a platform to receive the grain, an automatic self-raking device sweeping the grain, first parallel with the cutters to one side, and then to the rear, and a finger-bar and cutting apparatus so arranged, together with the platform, that the grain may be cut and delivered across the platform independent of the up-and-down movement of the main frame.

2. The combination of a dumping-box having a bottom hinged to the frame parallel to the cutters, and located in the rear of the main frame, in the center of the track of the supporting-wheels, with a raking device, substantially such as described, delivering the cut grain to said box in a compact form for binding.

JAMES PINE.

Witnesses:
C. E. WRIGHT,
SAML. KING.